(12) United States Patent
Molinar et al.

(10) Patent No.: US 11,383,755 B2
(45) Date of Patent: Jul. 12, 2022

(54) STEERING SHAFT ASSEMBLY AND METHOD OF ASSEMBLING SAME

(71) Applicant: Steering Solutions IP Holding Corporation, Saginaw, MI (US)

(72) Inventors: Sergio R. Molinar, Freeland, MI (US); Michael E. Partyka, Saginaw, MI (US); Brandon L. Finney, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/124,059

(22) Filed: Dec. 16, 2020

(65) Prior Publication Data
US 2022/0185360 A1 Jun. 16, 2022

(51) Int. Cl.
*B62D 1/185* (2006.01)
*F16D 3/06* (2006.01)
*F16C 3/035* (2006.01)
*F16D 3/40* (2006.01)

(52) U.S. Cl.
CPC ............ *B62D 1/185* (2013.01); *F16D 3/065* (2013.01); *B60Y 2410/102* (2013.01); *F16C 3/035* (2013.01); *F16D 3/40* (2013.01)

(58) Field of Classification Search
CPC .... B62D 1/185; B60Y 2410/102; F16C 3/035
See application file for complete search history.

(56) References Cited

U.S. PATENT DOCUMENTS

| | | | | |
|---|---|---|---|---|
| 6,557,433 B1* | 5/2003 | Castellon | ............... | B62D 1/185 403/359.1 |
| 8,182,354 B2* | 5/2012 | Jung | ....................... | F16D 3/065 464/167 |
| 11,091,189 B2* | 8/2021 | Wyss | ...................... | B62D 1/20 |
| 2007/0082743 A1* | 4/2007 | Park | ......................... | F16D 3/06 464/34 |
| 2019/0316635 A1* | 10/2019 | Schwarzhans | .......... | F16D 3/065 |
| 2020/0189647 A1* | 6/2020 | Schmidt | .................. | F16D 3/065 |

FOREIGN PATENT DOCUMENTS

| | | | | | |
|---|---|---|---|---|---|
| CN | 111183017 A | * | 5/2020 | ............. | B62D 1/16 |
| DE | 102017221004 A1 | * | 5/2019 | ............. | F16C 33/36 |
| DE | 102019205784 B3 | * | 6/2020 | ............. | F16C 35/02 |

(Continued)

*Primary Examiner* — Drew J Brown
(74) *Attorney, Agent, or Firm* — Dickinson Wright PLLC (57) ABSTRACT

A steering shaft assembly comprising female shaft and a male shaft. The female shaft includes an inner surface defining a plurality of outer roller bearing tracks. The male shaft includes an outer surface defining a plurality of inner roller bearing tracks. An adaptable sleeve assembly is located between the inner surface of the female shaft and the outer surface of the male shaft and includes a body. The body defines an outer surface for contacting the inner surface of the female shaft and an inner surface for contacting the outer surface of the male shaft. The body defines at least one rib projecting radially outwardly from the outer surface of the body and projecting radially inwardly from the inner surface of the body. The at least one rib is inserted into one of the plurality of inner roller bearing tracks and one of the plurality of outer roller bearing tracks.

15 Claims, 8 Drawing Sheets

(56) References Cited

FOREIGN PATENT DOCUMENTS

| | | | | | |
|---|---|---|---|---|---|
| EP | 3577012 | B1 | * | 3/2021 | ................ F16C 3/03 |
| ES | 2728553 | T3 | * | 10/2019 | ............ F16D 3/065 |
| JP | 2017166697 | A | * | 9/2017 | ............ F16C 29/002 |
| KR | 20100090017 | A | * | 8/2010 | |
| KR | 101526548 | B1 | * | 6/2015 | |
| KR | 101673563 | B1 | * | 11/2016 | |
| KR | 200490953 | Y1 | * | 1/2020 | |

* cited by examiner

STEERING SHAFT ASSEMBLY AND METHOD OF ASSEMBLING SAME

TECHNICAL FIELD

This disclosure relates to a steering shaft assembly and a method of assembling same and in particular to an adaptable sleeve assembly for a steering shaft and a method of assembling same.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire (SbW) and driver interface steering. These steering system schemes typically include a steering column having a steering shaft for translating steering input (e.g., a hand wheel) to an output that interacts with a steering gear to ultimately cause the vehicle wheels (or other elements) to turn the vehicle. Steering shafts generally include a female shaft and a male shaft extending along a common axis, with the male shaft partially located in the female shaft. In operation, the male shaft is permitted to move within the female shaft along the axis such that the steering shaft has a certain amount of axial movement. The axial movement can provide compression, for example, during an impact event. In addition, in implementations wherein the steering column is axially adjustable, the steering shaft can likewise be adjustable between one or more axial positions. Axially adjustable steering columns can provide flexibility to the location of a hand wheel. For example, axially adjustable steering columns are included in various applications to facilitate more comfortable driving positions for different sizes of drivers, more work space for a parked driver, or more space during autonomous driving.

Axial movement between the female shaft and the male shaft must also permit a certain amount of torque transfer from the steering input to the output. Axial movement and torque transfer can be facilitated by a number of interface configurations. Generally, the interface configurations include one of sliding or rolling elements. The sliding elements usually include a splined inner surface of the female shaft and a corresponding splined outer surface of the male shaft that permit relative axial movement and torque transfer. The rolling elements usually include a tracked inner surface of the female shaft and a corresponding tracked outer surface of the male shaft that are matched to define bearing channels wherein the bearing elements, such as roller bearings, can be located to permit relative axial movement and torque transfer.

End-use application of the steering shaft generally dictates which configuration is selected. For example, configurations with bearing elements are typically preferred for applications with high temperature and high torque, but also result in an increase in material costs, manufacturing costs, and weight. Configurations with sliding elements, on the other hand, are generally cheaper but not preferable for high torque and high temperature applications. There are numerous designs of steering shafts including either sliding elements or bearing elements and these numerous designs generally do not include any compatible components that can be interchanged between the sliding element and bearing element configurations.

Accordingly, steering shaft configurations that permit flexibility between either the sliding element and bearing element configurations for various end-use applications continue to be of interest.

SUMMARY

This disclosure relates generally to an adaptable sleeve assembly for connecting a female shaft to a male shaft of a steering shaft assembly configured to include roller bearings. The adaptable sleeve assembly comprises a body extending about an axis, the body defines an outer surface for contacting an inner surface of the provided female shaft and an inner surface for contacting an outer surface of the provided male shaft. The body defines at least one rib projecting radially outwardly from the outer surface of the body and projecting radially inwardly from the inner surface of the body. The at least one rib is inserted into an inner roller bearing track defined by the provided female shaft and an outer roller bearing track defined by the provided male shaft.

An aspect of the disclosed embodiments includes a steering shaft assembly comprising female shaft and a male shaft. The female shaft extends along an axis and includes an inner surface defining a plurality of outer roller bearing tracks. The male shaft extends along the axis and includes an outer surface defining a plurality of inner roller bearing tracks. An adaptable sleeve assembly is located between the inner surface of the female shaft and the outer surface of the male shaft. The adaptable sleeve assembly comprises a body extending along the axis, the body defines an outer surface for contacting the inner surface of the female shaft and an inner surface for contacting the outer surface of the male shaft. The body defines at least one rib projecting radially outwardly from the outer surface of the body and projecting radially inwardly from the inner surface of the body. The at least one rib is inserted into one of the plurality of inner roller bearing tracks and one of the plurality of outer roller bearing tracks.

Another aspect of the disclosed embodiments includes a method for forming a steering shaft assembly. The method comprises: forming a female shaft and a male shaft; forming an adaptable sleeve assembly; inserting at least one bearing element in the adaptable sleeve assembly; connecting the adaptable sleeve assembly to one of the female shaft and the male shaft with a connection feature; placing the male shaft into the female shaft with the adaptable sleeve assembly located between the female shaft and the male shaft and the bearing element located between an inner roller bearing surface of the female shaft and an outer rolling bearing surface of the male shaft; and heating the adaptable sleeve assembly to a creeping temperature or above until the adaptable sleeve assembly conforms to an inner surface of the female shaft and an outer surface of the male shaft.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicle, such as a car, truck, sport utility vehicle, crossover, mini-van, marine craft, aircraft, all-terrain vehicle, recreational vehicle, or other suitable vehicles, include various steering system schemes, for example, steer-by-wire (SbW) and driver interface steering. These steering system schemes typically include a steering column having a steering shaft for translating steering input (e.g., a hand wheel) to an output that interacts with a steering gear to ultimately cause the vehicle wheels (or other elements) to turn the vehicle. Steering shafts generally include a female shaft and a male shaft extending along a common axis, with the male shaft partially located in the female shaft. In operation, the male shaft is permitted to move within the female shaft along the axis such that the steering shaft has a certain amount of axial movement. The axial movement can provide compression, for example, during an impact event. In addition, in implementations wherein the steering column is axially adjustable, the steering shaft can likewise be adjustable between one or more axial positions. Axially adjustable steering columns can provide flexibility to the location of a hand wheel. For example, axially adjustable steering columns are included in various applications to facilitate more comfortable driving positions for different sizes of drivers, more work space for a parked driver, or more space during autonomous driving.

Axial movement between the female shaft and the male shaft must also permit a certain amount of torque transfer from the steering input to the output. Axial movement and torque transfer can be facilitated by a number of interface configurations. Generally, the interface configurations include one of sliding or rolling elements. The sliding elements usually include a splined inner surface of the female shaft and a corresponding splined outer surface of the male shaft that permit relative axial movement and torque transfer. The rolling elements usually include a tracked inner surface of the female shaft and a corresponding tracked outer surface of the male shaft that are matched to define bearing channels wherein the bearing elements, such as roller bearings, can be located to permit relative axial movement and torque transfer.

End-use application of the steering shaft generally dictates which configuration is selected. For example, configurations with bearing elements are typically preferred for applications with high temperature and high torque, but also result in an increase in material costs, manufacturing costs, and weight. Configurations with sliding elements, on the other hand, are generally cheaper but not preferable for high torque and high temperature applications. There are numerous designs of steering shafts including either sliding elements or bearing elements and these numerous designs generally do not include any compatible components that can be interchanged between the sliding element and bearing element configurations.

Steering shaft configurations that permit flexibility between either the sliding element and bearing element configurations for various end-use applications continue to be of interest.

Accordingly, an adaptable sleeve assembly and a method of assembling same, such as those described herein, configured to provide adaptability from a bearing element configuration to a sliding element configuration, may be desirable. In some embodiments, the adaptable sleeve assembly and the method of assembling same described herein may be configured to adapt a steering shaft with a bearing element configuration to a steering shaft with a sliding element configuration, such that a female shaft template and a male shaft template maybe adapted in accordance with a designated an end-use application.

Figure 1:
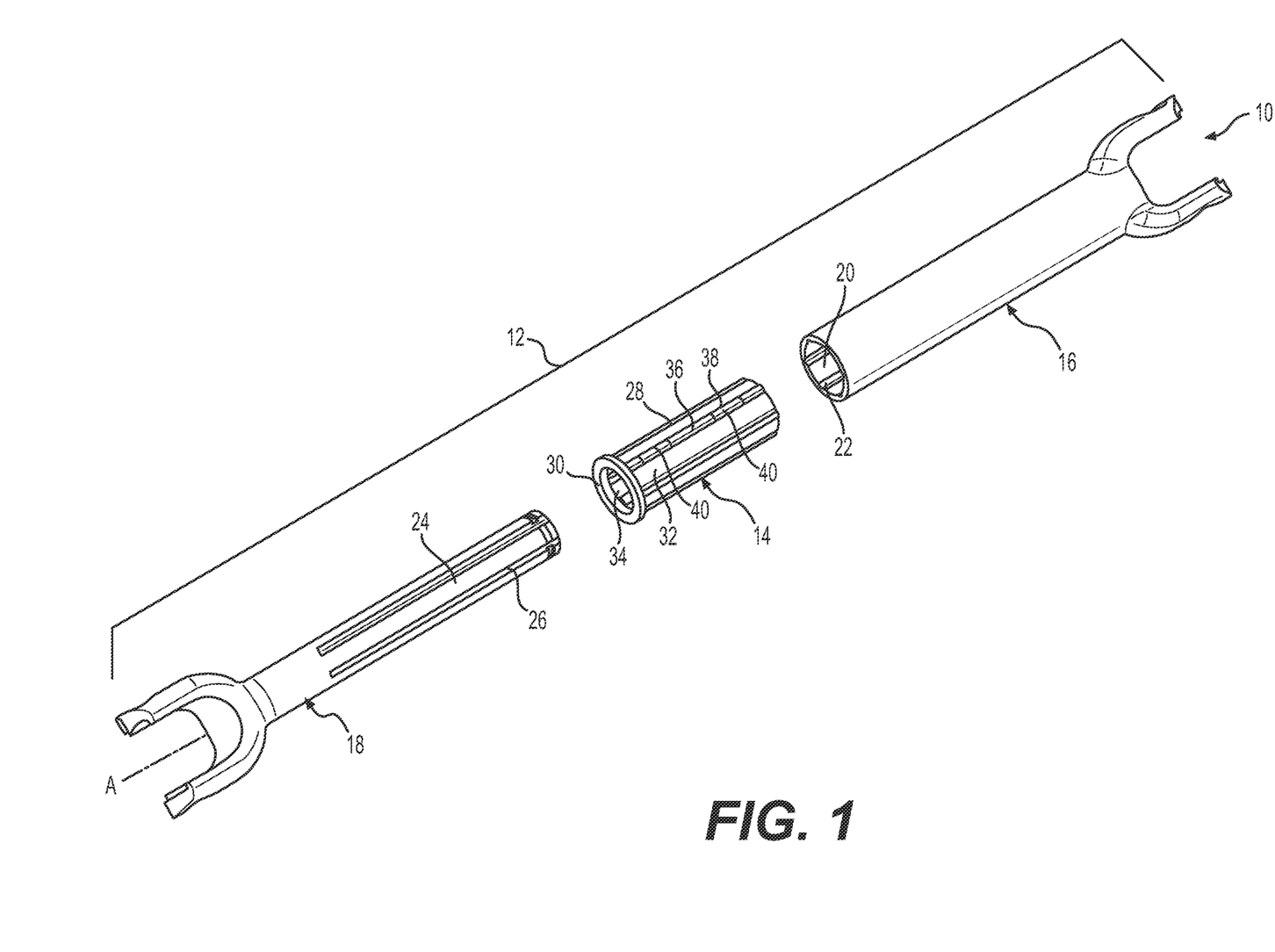
FIG. 1 generally illustrates a disassembled view of a steering shaft assembly including an adaptable sleeve assembly for a female shaft according to the principles of the present disclosure.

FIG. 1 generally illustrates a disassembled view of a steering shaft assembly 10 including a steering shaft 12 and an adaptable sleeve assembly 14. The steering shaft 12 includes a female shaft 16 and a male shaft 18 extending along an axis A. The female shaft 16 includes an inner surface 20 extending about the axis A and defining an opening for receiving the male shaft 18. The inner surface 20 of the female shaft 16 defines a plurality of outer tracks 22 located about the axis A and extending axially. The male shaft 18 includes an outer surface 24 defines a plurality of inner tracks 26. When assembled, the outer tracks 22 and the inner tracks 26 define channels sized for locating bearing elements, such as roller bearings.

Figure 5:
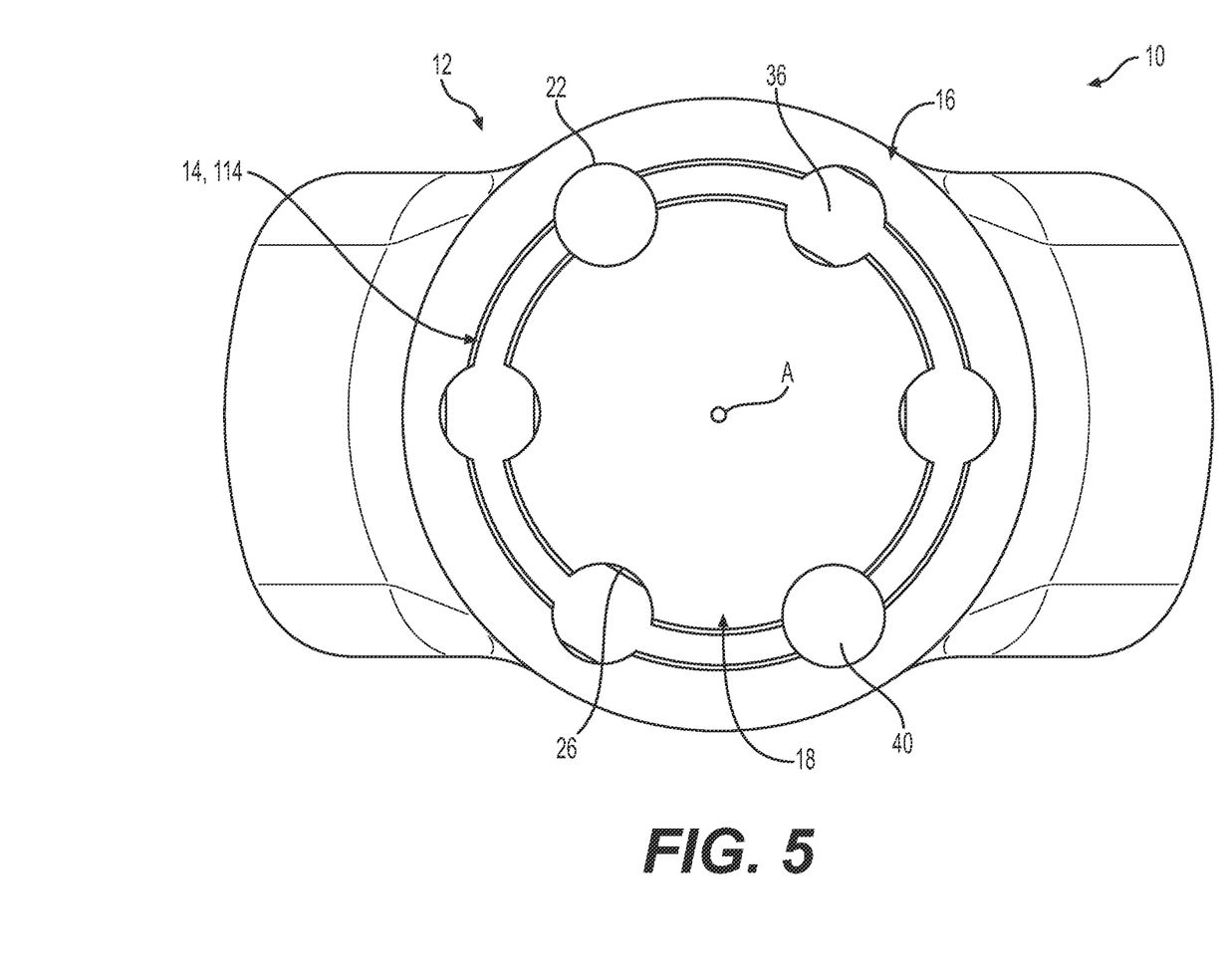
FIG. 5 generally illustrates a cross-sectional view of the steering shaft assembly with the adaptable sleeve assembly in accordance with FIGS. 1 through 4.

The adaptable sleeve assembly 14 includes a body 28 sized for inserting into the female shaft 16 between the female shaft 16 and the male shaft 18. At least one connection feature 30 is located on the body 28 for connecting the adapter sleeve assembly 14 to one of the female shaft 16 and the male shaft 18. As illustrated, the connection feature 30 may include a flange that extends radially outwardly from the body 28 for connection to the female shaft 16. The adaptable sleeve assembly 14 further includes an outer surface 32 facing radially outwardly towards the female shaft 16 and an inner surface 34 facing radially inwardly towards the male shaft 18. The body 28 defines at least one rib 36 that projects radially outwardly from the outer surface 32 and radially inwardly from the inner surface 34. The at least one rib 36 includes a cross-sectional shape that is similar in shape and size to the channel (i.e., the matched inner tracks 22 and outer tracks 26). The at least one rib 36 defines at least one opening 38 for the placement of at least one bearing element 40. As shown, the at least one bearing element 40 may include a bearing pin that has a cross-section that is of similar shape and size to the at least one rib 36 (FIG. 5). In some embodiments, the connection feature 30 may include clips, pins, adhesives, an outward flange or combinations thereof. In some embodiments, connection feature 30 may include a portion of the bearing element 40 that has been connected to the female shaft, for example, via welding, adhesives, bonding, pins clips, or combinations thereof.

Figure 2:
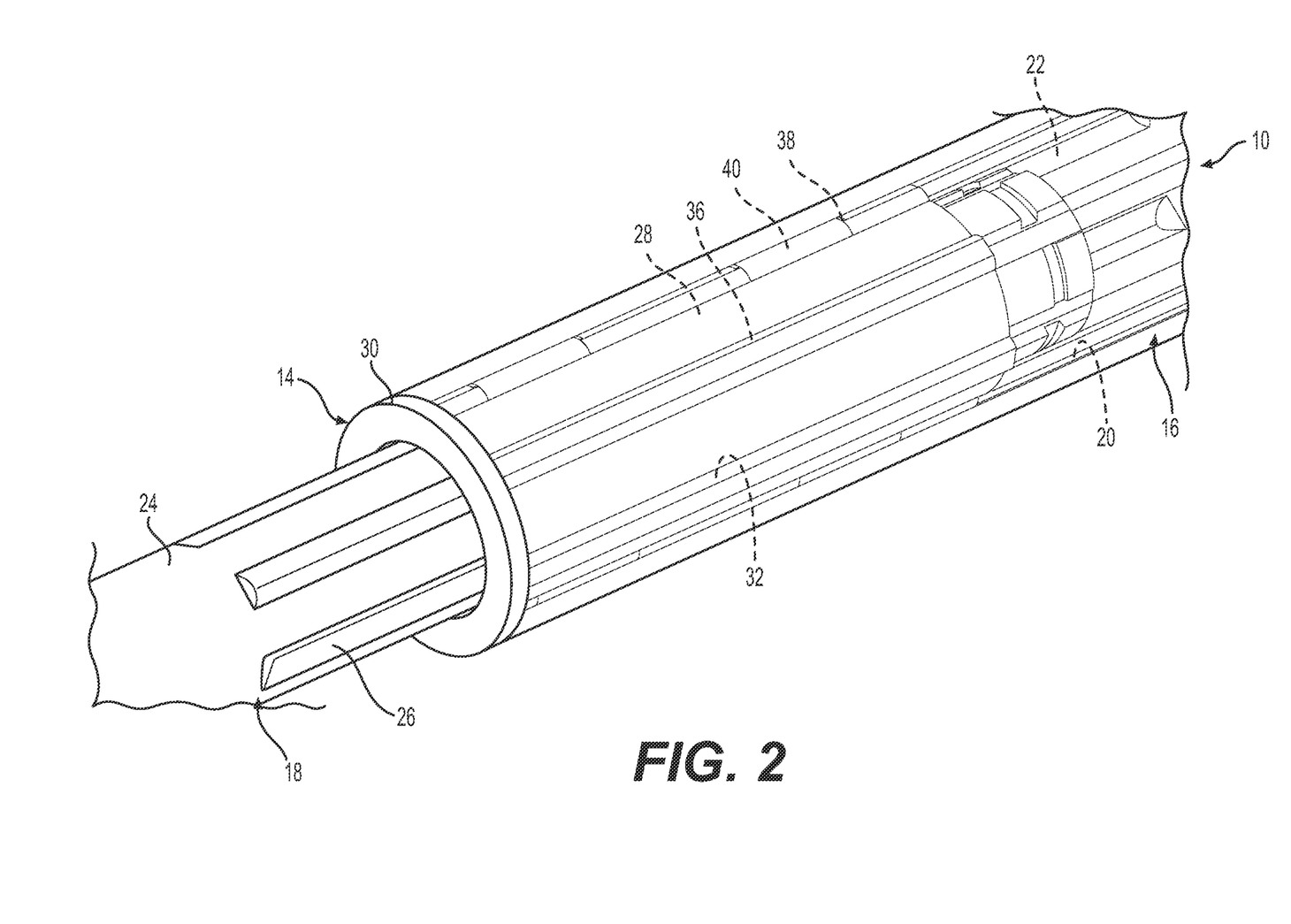
FIG. 2 generally illustrates a perspective view of the steering shaft assembly including the adaptable sleeve assembly for the female shaft according to the principles of the present disclosure.

FIG. 2 generally illustrates a perspective view of the steering shaft assembly 10 in an assembled state. In operation, the adaptable sleeve assembly 14 travels with the female shaft 16 relative to the male shaft 18. The adaptable sleeve assembly 14 is shown to include a plurality of ribs 36 and at least one of the ribs 36 defines a plurality of openings 38 with a bearing element 40 in each opening 38. The number of ribs 36 may be equal in number to the channels (i.e., the matched inner tracks 22 and outer tracks 26). In some embodiments, the number of ribs 36 may be less in number to the channels. In some embodiments, the number of channels may be two or more, four or more, six or more, eight or more, ten or more, twelve or more, or additional numbers. The plurality of openings 38 may include two or more, four or more, or additional numbers. Openings 38 may be located in every rib 36, alternating ribs 36, alternating pairs of diametrically opposite ribs 36, or other distributions. The number of bearing elements 40 located in each opening 38 may include one bearing element 38, two bearing elements 38, or more.

Figure 3:
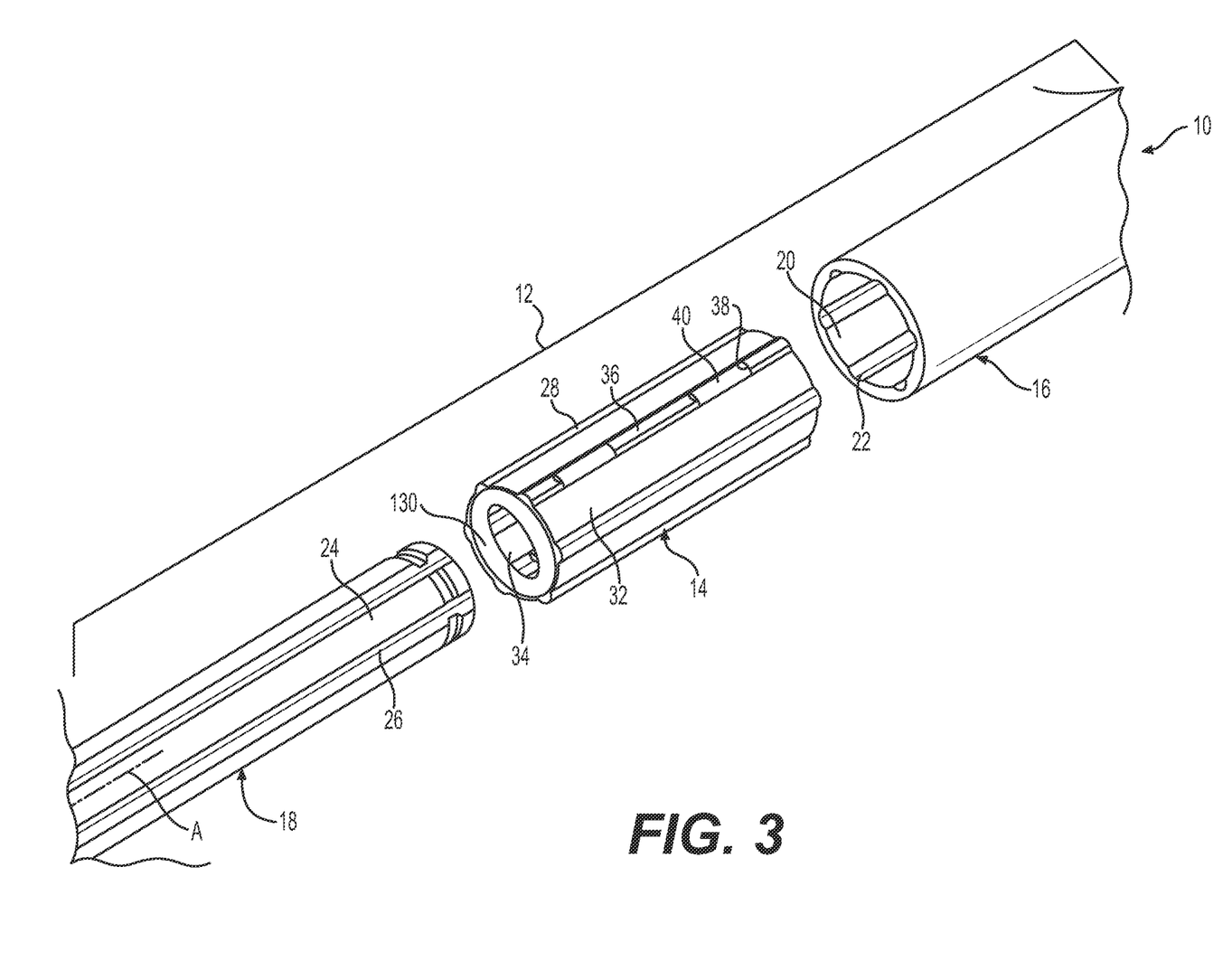
FIG. 3 generally illustrates a disassembled view of the steering shaft assembly including an adaptable sleeve assembly for a male shaft according to the principles of the present disclosure.

FIG. 3 generally illustrates a disassembled view of the steering shaft assembly 12 including an adaptable sleeve assembly 114 for a male shaft 18 according to the principles of the present disclosure. Unless otherwise detailed, the adaptable sleeve assembly 114 may include all the above described features of the adaptable sleeve 14 presented in FIGS. 1 and 2, with only a variation in connection features. More particularly, the adaptable sleeve assembly 114 may include a connection feature 130 adapted to connect the adaptable sleeve assembly 114 to the outer surface 24 of the male shaft 18. As illustrated, the connection feature 130 may include an inner flange, wherein the presented adaptable sleeve assembly 114 would be rotated 180° before connection to the male shaft 18. The flange may be configured to be an annular shape or a closed shape. In some embodiments, the connection feature 130 may include clips, pins, adhesives, the flange or combinations thereof. In some embodiments, connection feature 130 may include a portion of the bearing element 40 that has been connected to the male shaft 18, for example, via welding, adhesives, bonding, pins clips, or combinations thereof.

Figure 4:
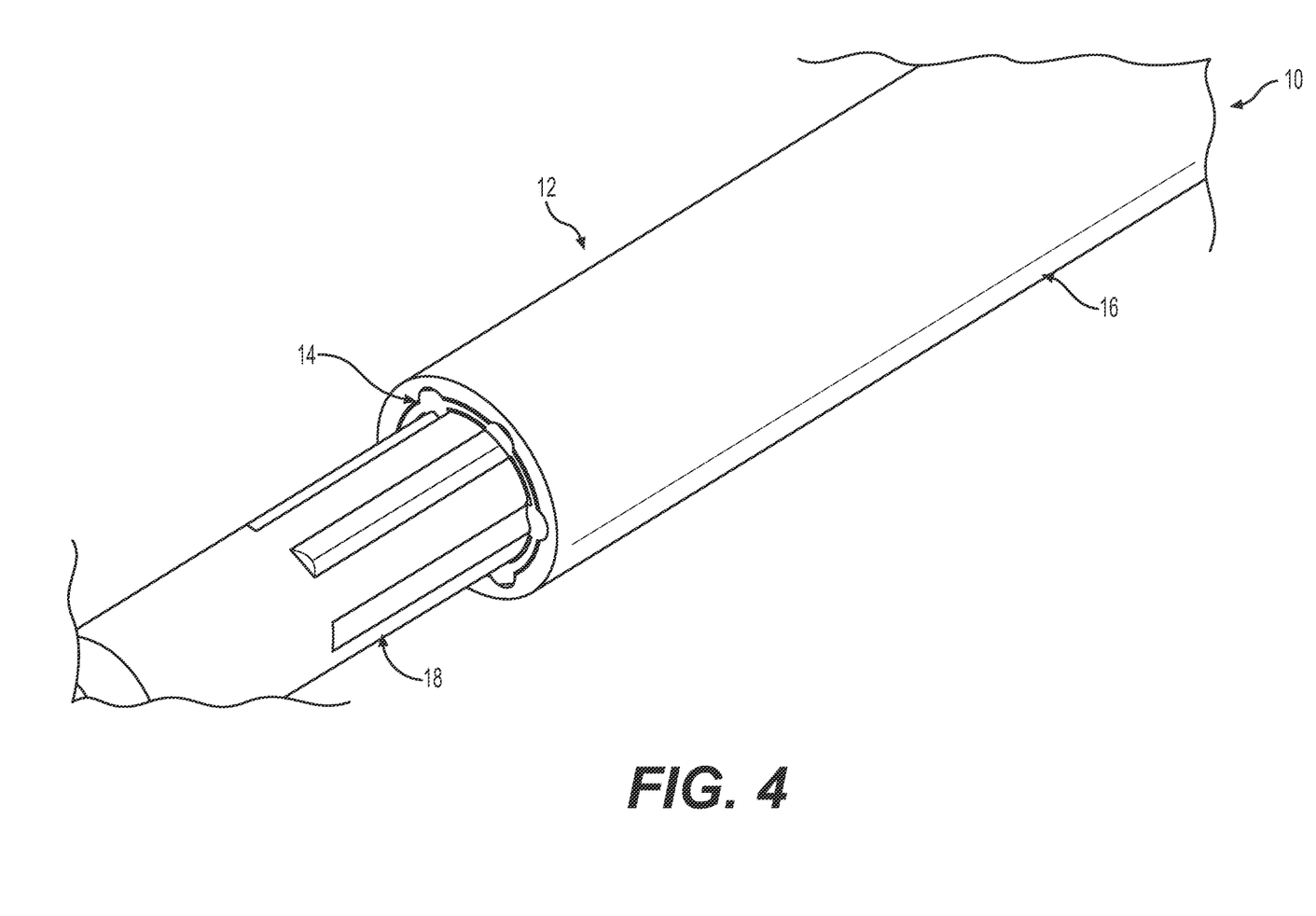
FIG. 4 generally illustrates a perspective view of the steering shaft assembly including the adaptable sleeve assembly for the male shaft according to the principles of the present disclosure.

FIG. 4 generally illustrates a perspective view of the steering shaft assembly 10 in an assembled state. In operation, the adaptable sleeve assembly 114 travels with the male shaft 18 relative to the female shaft 16.

FIG. 5 generally illustrates a cross-sectional view of the steering shaft assembly 10 with the adaptable sleeve (14, 114) assembly in accordance with FIGS. 1 through 4. As described, the number of ribs 36 may match the number of channels (i.e., the matched inner tracks 22 and outer tracks 26). However, it should be appreciated that in some embodiments, the female shaft 16 may include inner tracks 22 that are not equal in number to the outer tracks 26 defined by the male shaft 16. For example, the number of inner tracks 22 may equal six and the number of outer tracks 26 may equal three, thus the three inner tracks 22 and three of the outer tracks 26 are geometrically aligned around the axis A to define three channels. In some embodiments, a size of the inner tracks 22 may different than a size of the outer tracks 26 and define channels with non-circular cross-sections. In such arrangements, the ribs 36 and bearing elements 40 may be bulbously shaped to fit substantially within the non-circular channels.

Figure 6:
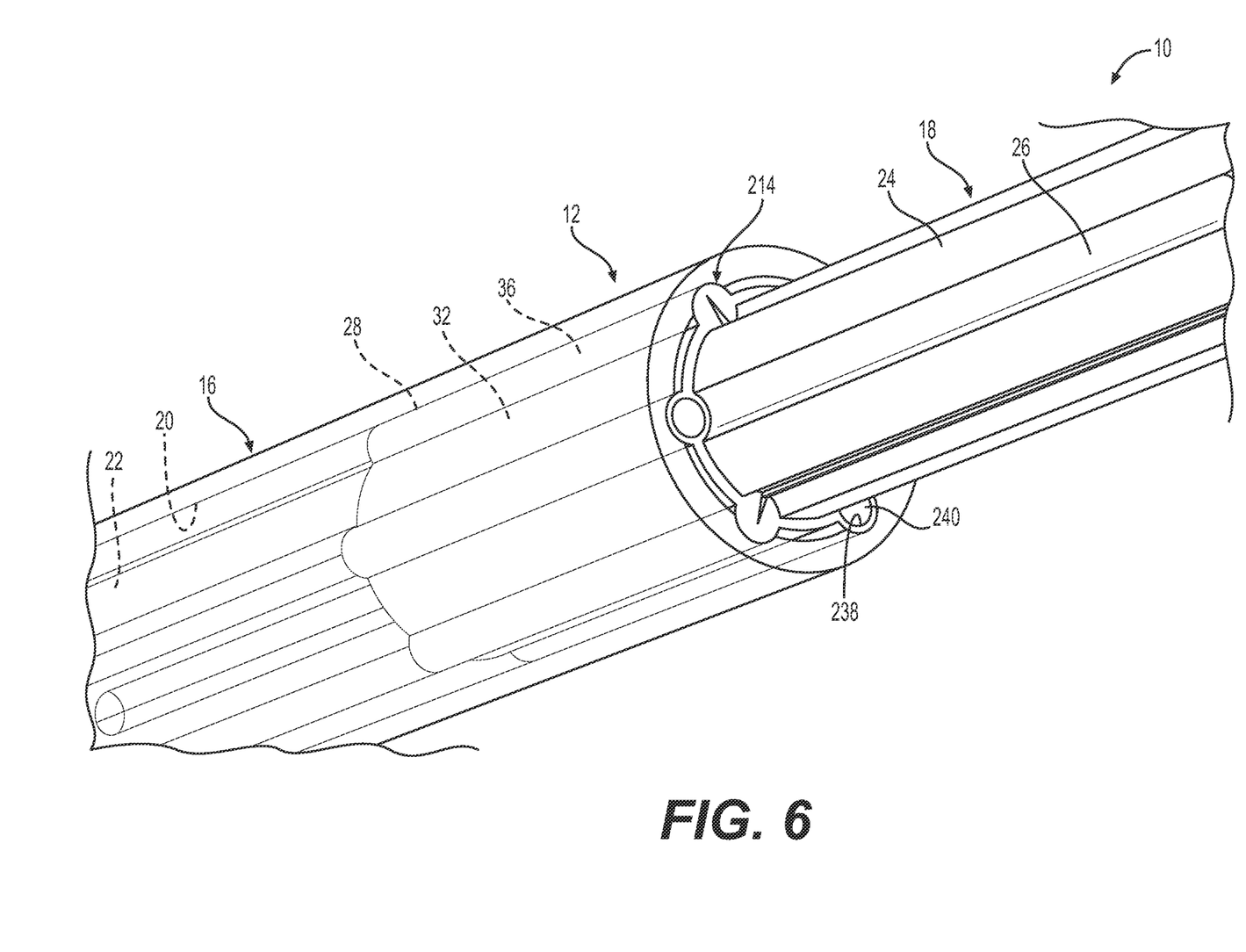
FIG. 6 generally illustrates a perspective view of the steering shaft assembly including an adaptable sleeve assembly in accordance with another embodiment according to the principles of the present disclosure.

FIG. 6 generally illustrates a perspective view of the steering shaft assembly including an adaptable sleeve assembly 214 in accordance with another embodiment according to the principles of the present disclosure. Unless otherwise detailed, the adaptable sleeve assembly 214 may include all the above described features of the adaptable sleeve (14, 114) presented in FIGS. 1 and 5, including the connection features (30, 130), with only a variation in the shape of the openings 238 and a shape of the bearing elements 240. More particularly, the opening 238 may extend axially through at least a portion of the associated rib 36. The bearing elements 240 may therefore be an elongated pin shape, or a series of shorter pins stacked along the axis A, and inserted into the opening 238.

Figure 7:
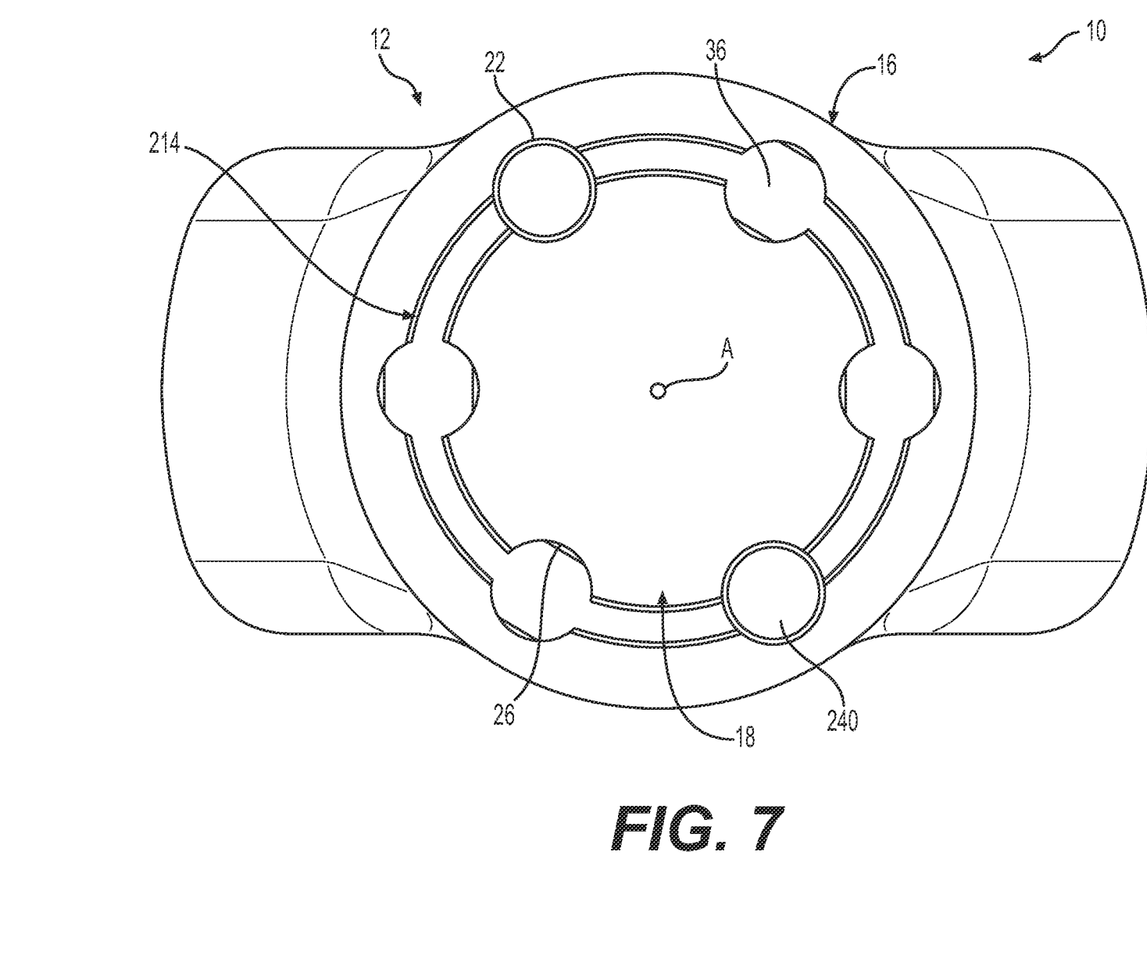
FIG. 7 generally illustrates a cross-sectional view of the steering shaft assembly with the adaptable sleeve assembly in accordance with FIG. 6.

FIG. 7 generally illustrates a cross-sectional view of the steering shaft assembly with the adaptable sleeve assembly 214 in accordance with FIG. 6. As shown, the bearing element 240 defines a cross-section that is smaller than the bearing elements 40 presented in FIGS. 1 through 5. In operation, the outside surface of the rib 36 is spaced between the bearing element 240 and the channel.

In some embodiments, the female sleeve 16, the male sleeve 18, and the bearing elements (40, 140) may comprise of one or more metal materials. The adaptable sleeve assembly (14, 114, 214) may comprise of one or more materials that are not metal and that have a lower melting or creeping temperature than the one or more metal materials. For example, the adaptable sleeve assembly (14, 114, 214) may comprise Nylon.

Figure 8:
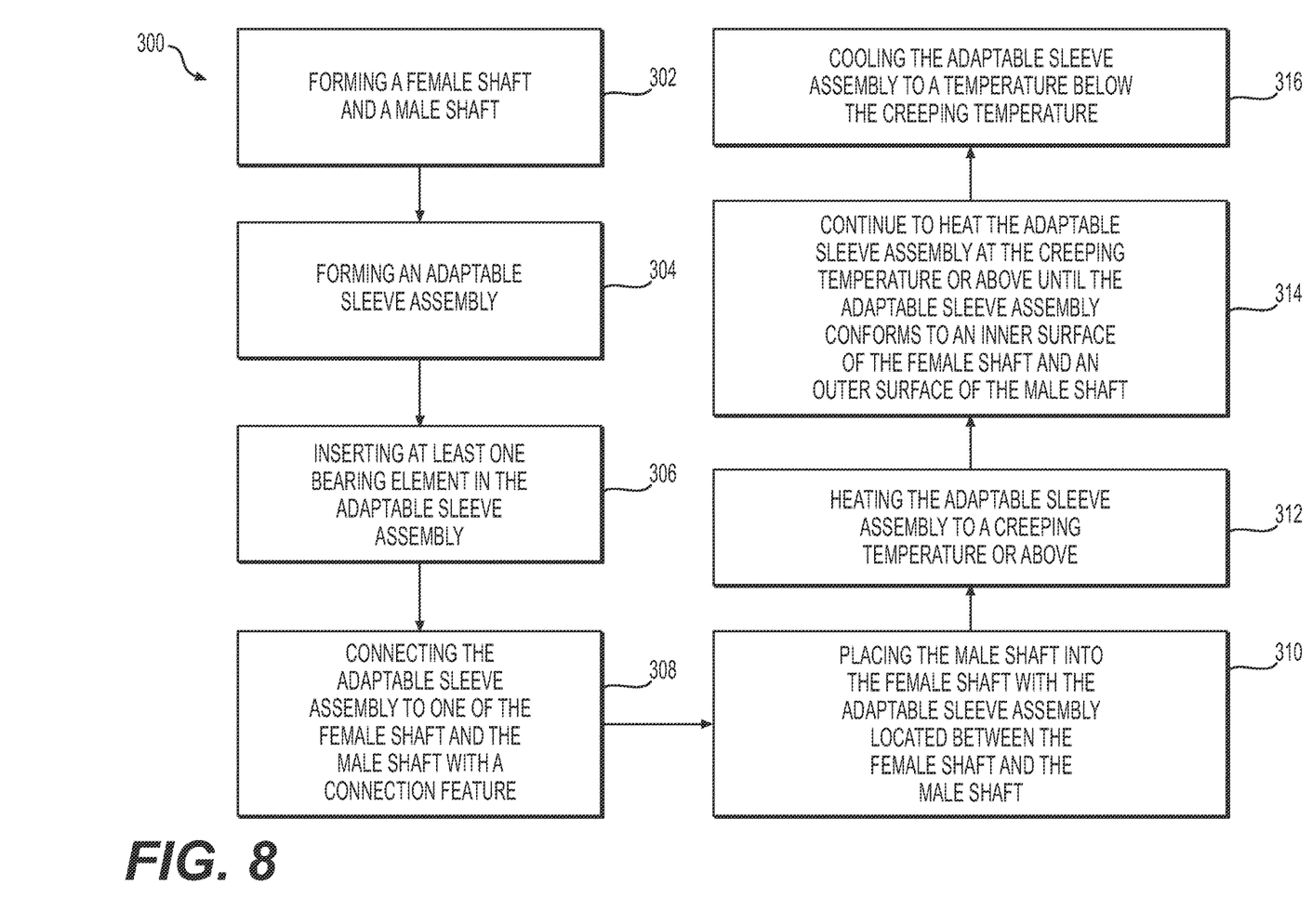
FIG. 8 is a flow diagram generally illustrating a method of assembling the steering shaft assembly with an adaptable sleeve assembly according to the principles of the present disclosure.

FIG. 8 is a flow diagram generally illustrating a method 300 of assembling a steering shaft assembly with an adaptable sleeve assembly according to the principles of the present disclosure. At 302, the method 300 includes forming a female shaft and a male shaft. For example, the female shaft and the male shaft may be formed of a metal material, for example, a material comprising steel or steel alloys. At 304, the method 300 includes forming an adaptable sleeve assembly. For example, the adaptable sleeve assembly may be formed of Nylon, other non-metal materials exhibiting high sheer strength, or other materials. At 306, the method 300 includes inserting at least one bearing element in the adaptable sleeve assembly. For example, inserting a bearing element in an opening of a rib of the adaptable sleeve assembly. At 308, the method 300 includes connecting the adaptable sleeve assembly to one of the female shaft and the male shaft with a connection features. At 310, the method 300 includes placing the male shaft into the female shaft with the adaptable sleeve assembly located between the female shaft and the male shaft. At 312, the method 300 includes heating the adaptable sleeve assembly to a creeping temperature or above. For example, the female shaft, male shaft, and adaptable sleeve assembly may be heated together in a furnace or the like. At 314, the method 300 includes continuing to heat the adaptable sleeve assembly at the creeping temperature or above until the adaptable sleeve assembly conforms to an inner surface of the female shaft and an outer surface of the male shaft. For example, at 314, the method may include continually heating and moving the male shaft relative to the female shaft along the axis. At 316, the method 300 includes cooling the adaptable sleeve assembly to a temperature below the creeping temperature. For example, cooling the adaptable sleeve assembly with a coolant of liquid, gas, or ambient.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. An adaptable sleeve assembly for connecting a female shaft to a male shaft of a steering shaft assembly configured to include roller bearings, the adaptable sleeve assembly comprising:
   a body extending about an axis, the body defining an outer surface for contacting an inner surface of the provided female shaft and an inner surface for contacting an outer surface of the provided male shaft; and
   the body defining at least one rib projecting radially outwardly from the outer surface of the body and projecting radially inwardly from the inner surface of the body, wherein the at least one rib is inserted into an inner roller bearing track defined by the provided female shaft and an outer roller bearing track defined by the provided male shaft, wherein the at least one rib defines at least one opening for placing at least one bearing element that extends radially outwardly past the outer surface of the body and radially inwardly past an inner surface of the body, wherein the at least one opening includes an opening that extends centrally through the at least one rib and the at least one bearing element includes an elongated pin located in the opening, wherein the elongated pin is spaced from the inner roller bearing track defined by the provided female shaft and the outer roller bearing track defined by the provided male shaft by the at least one rib.

2. The adaptable sleeve assembly of claim 1, wherein the at least one bearing element includes a pin extending parallel to the axis.

3. The adaptable sleeve assembly of claim 2, wherein the at least one rib extends parallel to the axis.

4. The adaptable sleeve assembly of claim 2, wherein the at least one rib defines a plurality of openings with at least one bearing element located in each of the openings.

5. The adaptable sleeve assembly of claim 1, wherein the at least one bearing element contacts the inner roller bearing track defined by the provided female shaft and the outer roller bearing track defined by the provided male shaft.

6. The adaptable sleeve assembly of claim 1, wherein the plurality of ribs is equal in number to at least one of number of the inner roller bearing tracks defined by the provided female shaft and the number of the outer roller bearing tracks defined by the provided male shaft.

7. The adaptable sleeve assembly of claim 1, wherein the adaptable sleeve assembly further comprises a connection feature for axially connecting the adaptable sleeve assembly to one of the female shaft and the male shaft.

8. The adaptable sleeve assembly of claim 1, wherein the adaptable sleeve assembly is formed of a material with a lower creeping temperature than the female shaft and the male shaft.

9. A steering shaft assembly comprising:
   a female shaft extending along an axis and including an inner surface defining a plurality of outer roller bearing tracks;
   a male shaft extending along the axis and including an outer surface defining a plurality of inner roller bearing tracks; and
   an adaptable sleeve assembly located between the inner surface of the female shaft and the outer surface of the male shaft, the adaptable sleeve assembly comprising:
      a body extending along the axis, the body defining an outer surface for contacting the inner surface of the female shaft and an inner surface for contacting the outer surface of the male shaft; and
      the body defining at least one rib projecting radially outwardly from the outer surface of the body and projecting radially inwardly from the inner surface of the body, wherein the at least one rib is inserted into one of the plurality of inner roller bearing tracks and one of the plurality of outer roller bearing tracks, wherein the plurality of ribs is equal in number to at least one of number of the inner roller bearing tracks and the number of the outer roller bearing tracks, wherein the number of the inner roller bearing tracks and the number of the outer roller bearing tracks are not equal, and the plurality of ribs are equal in number to whichever of the inner roller bearing tracks and the outer roller bearing tracks are less in number.

10. The steering shaft assembly of claim 9, wherein the at least one rib defines at least one opening for placing at least one bearing element that extends radially outwardly past the outer surface of the body and radially inwardly past an inner surface of the body.

11. The steering shaft assembly of claim 10, wherein the adaptable sleeve assembly further comprises a connection feature for axially connecting the adaptable sleeve assembly to one of the female shaft and the male shaft.

12. The steering shaft assembly of claim 11, wherein the connection feature includes a flange projecting radially outwardly from the body to axially connect the adaptable sleeve assembly to the female shaft.

13. The steering shaft assembly of claim 11, wherein the connection feature includes a flange projecting radially inwardly from the body to axially connect the adaptable sleeve assembly to the male shaft.

14. The steering shaft assembly of claim 9, wherein the plurality of ribs is equal in number to each of the number of the inner roller bearing tracks and the number of the outer roller bearing tracks.

15. A method for forming a steering shaft assembly comprising:

forming a female shaft and a male shaft;

forming an adaptable sleeve assembly;

inserting at least one bearing element in the adaptable sleeve assembly;

connecting the adaptable sleeve assembly to one of the female shaft and the male shaft with a connection feature;

placing the male shaft into the female shaft with the adaptable sleeve assembly located between the female shaft and the male shaft and the bearing element located between an inner roller bearing surface of the female shaft and an outer rolling bearing surface of the male shaft; and heating the adaptable sleeve assembly to a creeping temperature or above until the adaptable sleeve assembly conforms to an inner surface of the female shaft and an outer surface of the male shaft.

* * * * *